US008386547B2

(12) United States Patent
Hargil et al.

(10) Patent No.: US 8,386,547 B2
(45) Date of Patent: Feb. 26, 2013

(54) INSTRUCTION AND LOGIC FOR PERFORMING RANGE DETECTION

(75) Inventors: Asaf Hargil, Haifa (IL); Evgeny Fiksman, Qirjat Yam (IL); Artiom Myaskouvskey, Qirjat Motzkin (IL); Doron Orenstien, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1153 days.

(21) Appl. No.: 12/290,565

(22) Filed: Oct. 31, 2008

(65) Prior Publication Data

US 2010/0115014 A1    May 6, 2010

(51) Int. Cl.
*G06F 7/00*    (2006.01)
(52) U.S. Cl. ...................................................... 708/207
(58) Field of Classification Search .................. 708/207
See application file for complete search history.

(56) References Cited

U.S. PATENT DOCUMENTS

| 4,918,618 | A  | * | 4/1990 | Tomlinson, Jr. ................ 706/25 |
| 6,427,438 | B1 | * | 8/2002 | Yasui et al. ..................... 60/277 |
| 2003/0018687 | A1 | | 1/2003 | Kalafatis et al. |
| 2005/0044123 | A1 | | 2/2005 | Sazegari et al. |
| 2007/0074007 | A1 | | 3/2007 | Topham et al. |
| 2007/0186083 | A1 | | 8/2007 | Vermeire |

OTHER PUBLICATIONS

International Search Report and the Written Opinion of the International Searching Authority for International Application No. PCT/US2009/062307, May 3, 2010, Korean Intellectual Property Office, Government Complex—Daejeon, Republic of Korea.

* cited by examiner

*Primary Examiner* — Tan V. Mai
(74) *Attorney, Agent, or Firm* — Mnemoglyphics, LLC; Lawrence M. Mennemeier

(57) ABSTRACT

A technique to accelerate range detection in a spline calcuation. In one embodiment, an instruction and corresponding logic are provided to perform range detection within a computer or processor.

23 Claims, 6 Drawing Sheets

INSTRUCTION AND LOGIC FOR PERFORMING RANGE DETECTION

FIELD OF THE INVENTION

Embodiments of the invention relate generally to the field of information processing and more specifically, to the field performing range detection in computing systems and microprocessors.

BACKGROUND

Performance of mathematical functions in computer hardware, such as microprocessors, may rely on the use of look-up tables (LUTs) stored in some location, such as cache or main memory. Single instruction multiple data (SIMD) instructions may perform multiple memory operations to access LUTs when performing mathematical functions, in hardware. For example, a SIMD instruction that performs a function based on a number of input operands may access a LUT for each one of the input operands in order to obtain a result output to the SIMD function. Because some processor architectures don't provide parallel accesses to a number of LUTs, but rather use the same memory access logic to access one or more LUTs, these LUT accesses may occur in series, instead of a parallel fashion, thereby limiting the performance of performing the SIMD function.

Mathematical functions may be evaluated in some algorithms using splines or other polynomial-based techniques. In some prior art examples, spline functions used to evaluate mathematical functions require multiple software operations to perform things, like range detection, coefficient matching, and polynomial calculations. Use of splines to evalue mathematical functions, can therefore, be computationally intensive and relatively low in performance, thus limiting the usefulness of splines calculations in computer programs.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Embodiments of the invention may be used to improve mathematical computation performance in microprocessors and computers. In some embodiment, spline calculations may be used to perform various mathematical operations at greater performance levels than some prior art spline calculations. In at least one embodiment, spline calculation performance may be improved by accelerating at least one of the most time-consuming and resource-consuming operations involved in performing spline calculations. In one embodiment, a range detection instruction and corresponding hardware logic is provided to accelerate the detection of ranges within a spline, which correspond to the various polynomials used in spline calculations.

Figure 1:
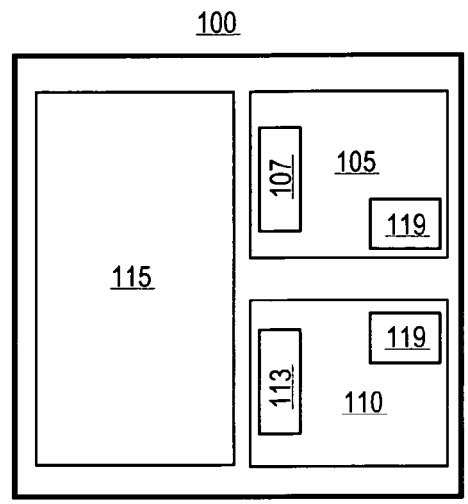
FIG. 1 illustrates a block diagram of a microprocessor, in which at least one embodiment of the invention may be used.

FIG. 1 illustrates a microprocessor in which at least one embodiment of the invention may be used. In particular, FIG. 1 illustrates microprocessor 100 having one or more processor cores 105 and 110, each having associated therewith a local cache 107 and 113, respectively. Also illustrated in FIG. 1 is a shared cache memory 115 which may store versions of at least some of the information stored in each of the local caches 107 and 113. In some embodiments, microprocessor 100 may also include other logic not shown in FIG. 1, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 119 to perform range detection in response to an instruction, according to one embodiment.

Figure 2:
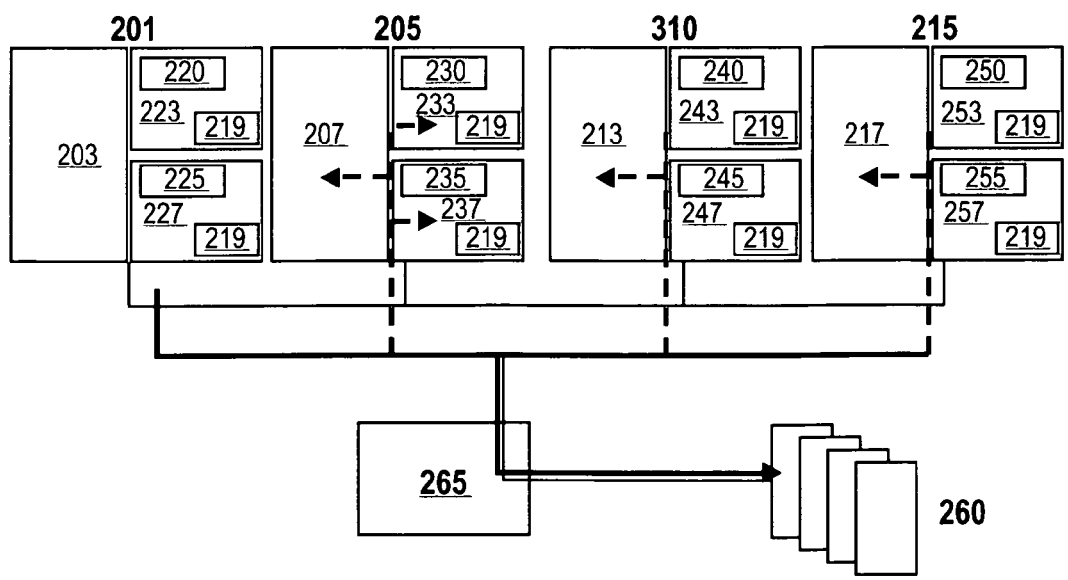
FIG. 2 illustrates a block diagram of a shared bus computer system, in which at least one embodiment of the invention may be used.

FIG. 2, for example, illustrates a front-side-bus (FSB) computer system in which one embodiment of the invention may be used. Any processor 201, 205, 210, or 215 may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from any one of the shared level two (L2) caches 203, 207, 213, 217 or from system memory 260 via chipset 265. One or more of the processors in FIG. 2 may include or otherwise be associated with logic 219 to perform a range detection instruction according to one embodiment.

Figure 3:
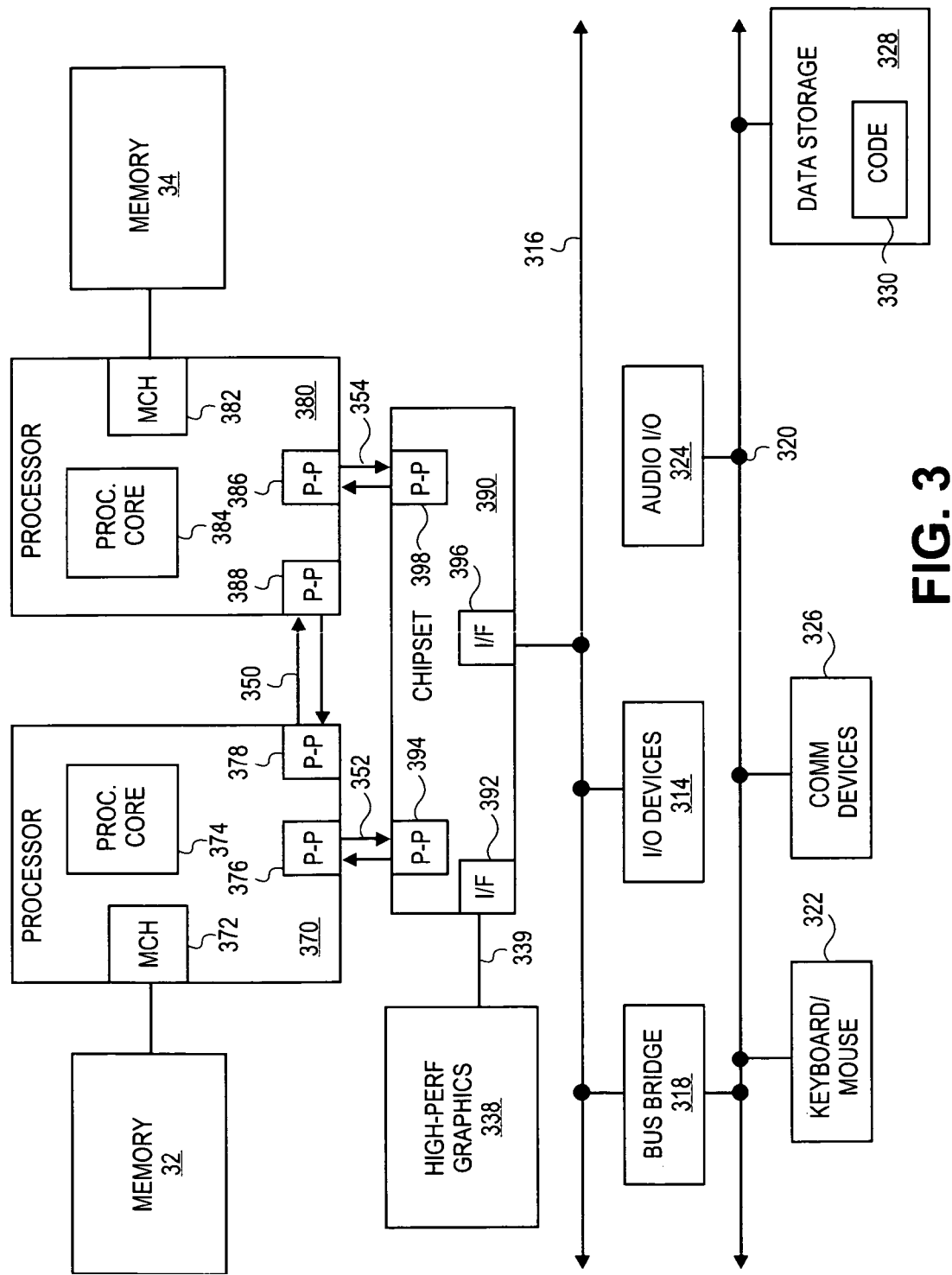
FIG. 3 illustrates a block diagram a point-to-point interconnect computer system, in which at least one embodiment of the invention may be used.

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 3 may include or otherwise be associated with logic 319 to perform a range detection instruction according to one embodiment.

Figure 4:
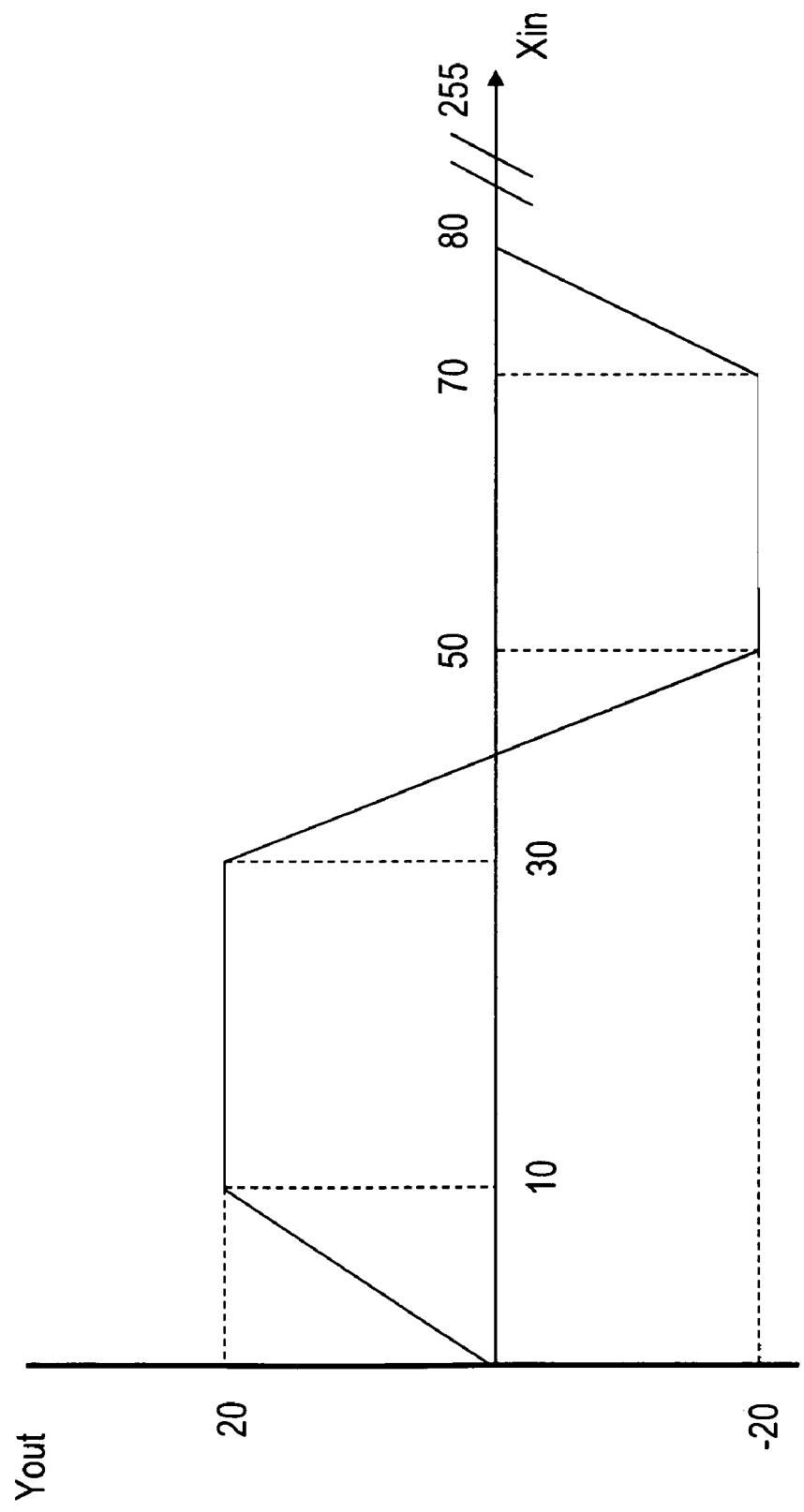
FIG. 4 illustrates a spline divided into regions, according to one embodiment.

Spline calculations can negate the need to use look-up tables (LUTs) and the costly memory accesses that are associated therewith. FIG. 4, for example, illustrates a first-order spline function. In FIG. 4, let "X" be an 8 element input vector whose elements contain data, "Xin" each represented by 32 bits for 256 bits total in the vector X. The elements, "Yout", of a vector, Y, of the spline function for any given input, "Xin" may result in a vector, W=Y(X). The elements of the vector W may be evaluated using spline calcuation operations, including range detection, coefficient matching, and polynomial calculation. At least one embodiment includes an instruction and logic to perform range detection in evaluating the spline function. In some embodiments, the element size of vectors X may be 8 bits, in other embodiments, however, they may be 16 bits, 32 bits, 64 bits, 128 bits, etc. Furthermore, in some embodiments, the elements of X may be integers, floating point numbers, single or double precision floating point numbers, etc.

In one embodiment, range detection logic may include decode and execution logic to perform a range detection instruction having an instruction format and control fields to perform the expression, "Range Vector (R)=Range_Detect (Input vector (X), Range Limit vector (RL))", where R is a range vector produced by logic described in FIG. 5, X is the input vector and RL is a vector containing the first Xin of each range of the spline function. For example, in one embodiment, the vector RL contains the first Xin (0, 10, 30, 50, 70, 80, 255) of each range of FIG. 4, in some order corresponding to the input vector, X.

In one embodiment, range detection matches a specific range of the spline function illustrated in FIG. 4 according to each input point provided within the input vector X and stores the result in a SIMD register. The following example shows an input vector X and an range detector vector corresponding to the spline described in FIG. 4. The given example describes operations on a 16 bit fixed point input; however the same technique is applicable for 8, 32 bit fixed and floating point numbers, as well as for different data types used in current and future vector extensions.

Let X be the following input vector, where each element contains an Xin value along the x-axis of FIG. 4:

$$X = \boxed{25}\,\boxed{77}\,\boxed{32}\,\boxed{8}\,\boxed{47}\,\boxed{123}\,\boxed{62}\,\boxed{1}$$

The range detection vector, based on the input vector X above and the spline depicted in FIG. 4 would contain the following:

$$R = \boxed{2}\,\boxed{5}\,\boxed{3}\,\boxed{1}\,\boxed{3}\,\boxed{6}\,\boxed{4}\,\boxed{1}$$

In one embodiment, an instruction may be performed to generate the above range detection vector by operating on the input vector according to the spline of FIG. 4. In one embodiment, the instruction causes the input vector elements to be compared with each one of the range limits (0, 10, 30, 50, 70, 80, in FIG. 4). In one embodiment, each range limit may be broadcast to a SIMD register and compared with the input vector X. In one embodiment, where comparison operations result in a 0 or −1 to indicate the result of the comparison, subtraction and accumulation of the comparison results generate the range of the spline in which each input point in the input vector X is contained. Logic to perform the comparison operations is illustrated in FIG. 5, where $x_i$ denotes an input point within input vector X, $t_i$ describes a range limit of the spline of FIG. 4, and $r_i$ describes the resulting range within range detection vector R, corresponding to input point $x_i$. In other embodiments, the comparison operations may result in other values (e.g., 1 and 0), which may be performed using comparison, addition or subtraction, and accumulation of the compared values to generate range detection register R.

Figure 5A:
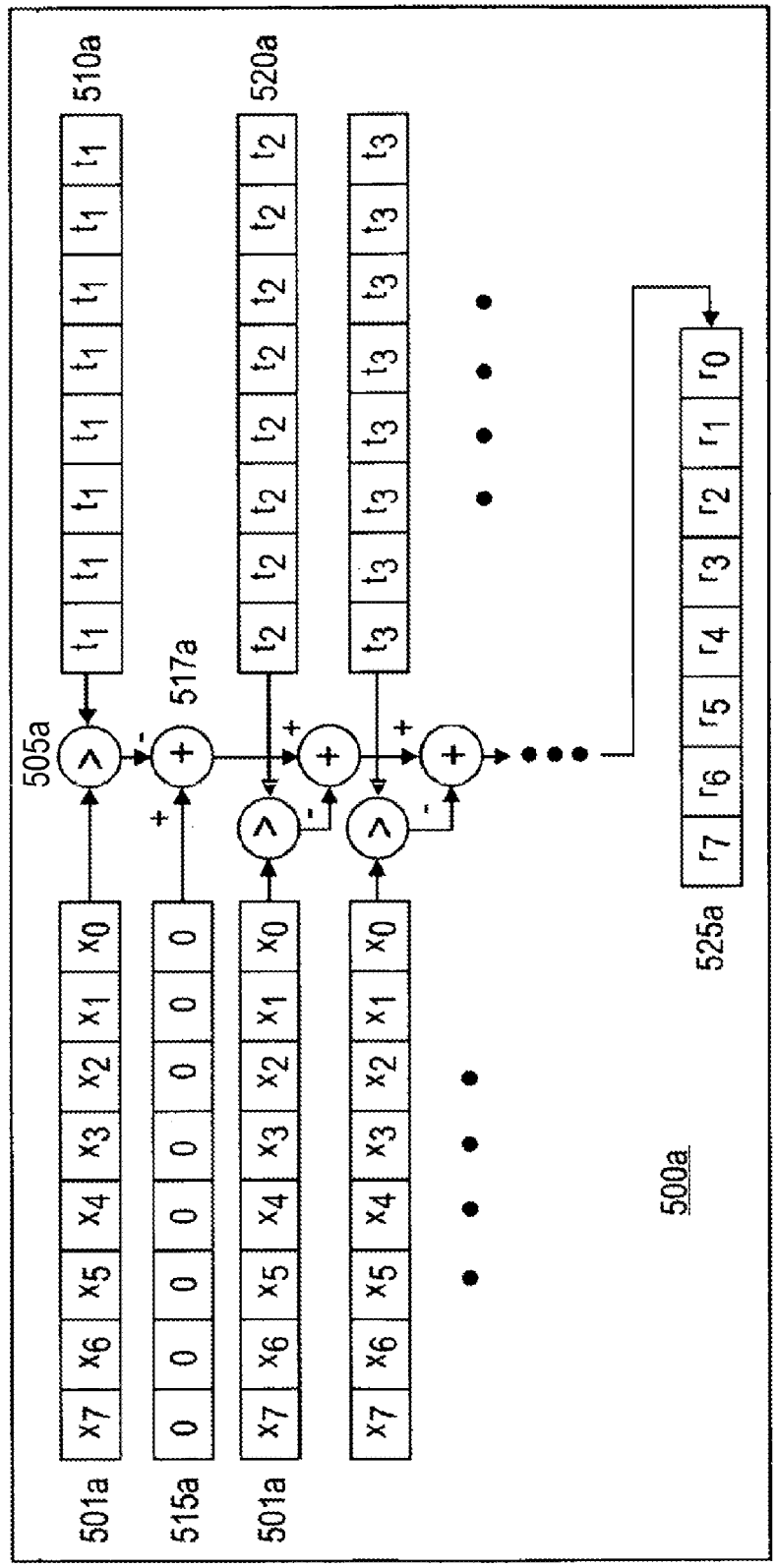
FIGS. 5a and 5b are, respectively, a diagram of logic and a binary search tree that may be used to accelerate range detection within a spline in response to a range detection instruction, according to one embodiment.

FIG. 5a illustrates logic that may be used to generate a range detection vector R in response to performing a range detection instruction, according to one embodiment. In one embodiment, logic 500a includes input vector X 501a being compared by comparison logic 505a with range limit vector 510a, which includes in each element, the range limit of the spline range corresponding to the "i"th element of the input vector X. In one embodiment, an element of input vector 501a is compared against the corresponding element of range limit register 510a by comparison logic 505a. In one embodiment, elements of zero vector 515a is added 517a to the negative of the result of the comparison of input vector 501a and range limit vector 510a, to generate a 0 or −1 in each element of the result of the comparison result. The input vector 501a is then compared against corresponding elements of range limit vector 520a, the negative result of which is added to the previous comparison result. This process is continued for each element of range limit vector 510a, culminating in range detection vector 525a.

In one embodiment, the logic of FIG. 5a may be used in conjunction with a program using at least one instruction set architecture, illustrated by the following pseudo-code:

```
m128i data_in = _mm_load_si128((m128i*) (pInImage+iX));
// Start range search
// Find data indexes in range [a0, a1, a2, a3, a4,
    a5, a6, a7]
m128i indexes = _mm_setzero_si128( );
m128i rangeInx = m128InxUpdate;
for (int j=1; j<DIFF_FUNC_POINTS; ++j)
{
    //broadcast current range
    m128i range = _mm_shuffle_epi8(m128Ranges,
        rangeInx);
    //update current index
    rangeInx = _mm_add_epi8(rangeInx,
        rangeInxInc);
    //compare input vector to current range
    range = _mm_cmplt_epi16(range, data_in);
    //accumulate result − cmplt return 0/−1
    indexes = _mm_sub_epi8(indexes, range);
}
```

Figure 5B:
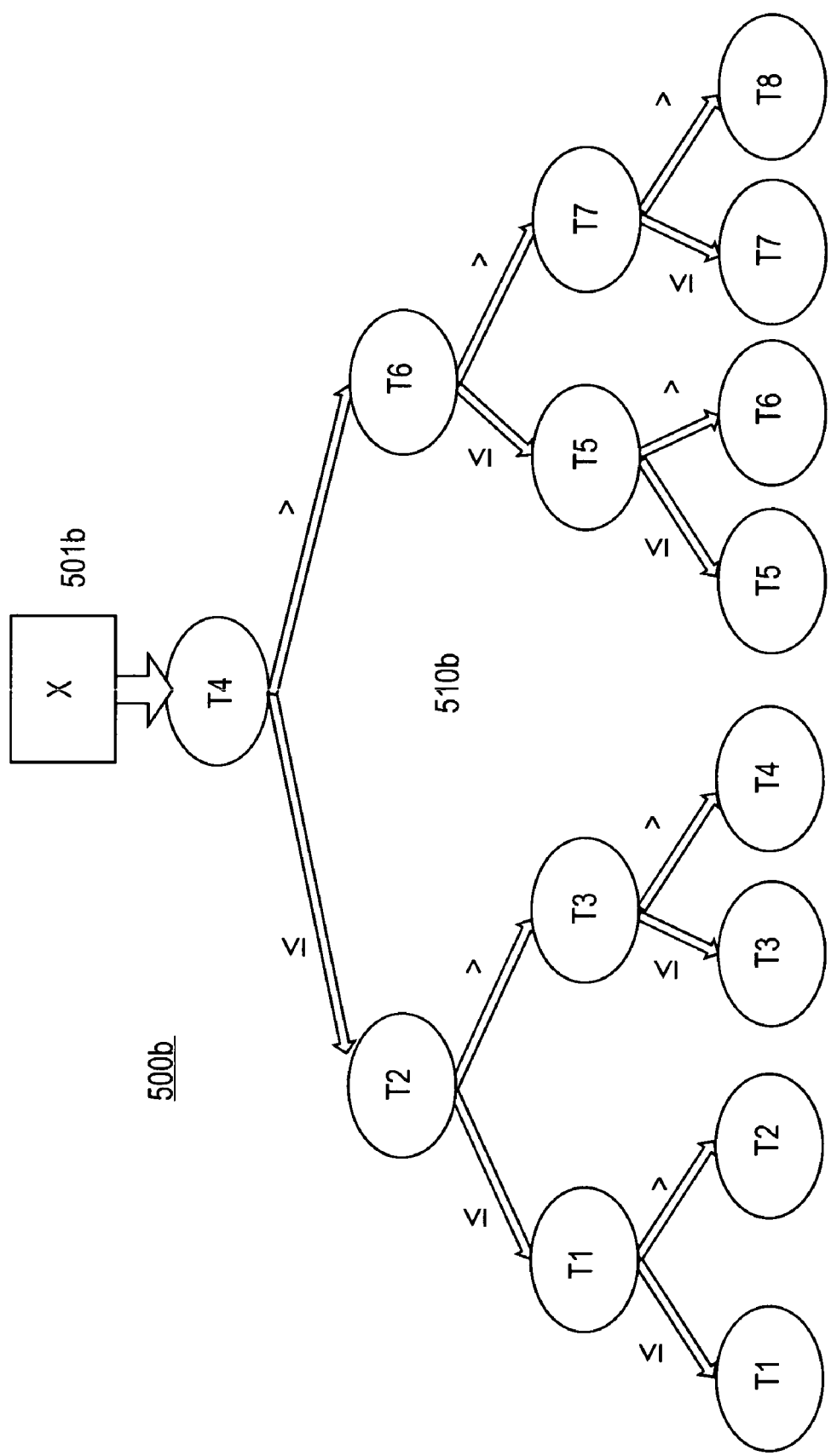

Other techniques for determining range detection vector R may be used in other embodiments, including logic to perform a binary search on the range limit vector elements. FIG. 5b illustrates a binary search tree, according to one embodiment, which may be used to generate range detection vector R. In the binary search tree 500b of FIG. 5b, each element of input vector X 501b is compared with each element 510b of the range limit vector starting at a mid-vector element (T4, in the case of the 8 element input and range limit vectors) and continuing to each half vector (T5-T8, and T3-T1). In one embodiment, the following pseudo-code illustrates the functioning of the binary search tree of FIG. 5b, using instructions from one instruction set architecture.

```
T = [t1, t2, t3, t4, t5, t6, t7, t8] // (t's are sorted)
X = [x1, x2, x3, x4, x5, x6, x7, x8]
```

-continued

```
I = [4, 4, 4, 4, 4, 4, 4, 4]
I1 = GT(X, PSHUFFLE(T, I)) // GT return −1 if A<=B and 0 if A>B
I = I + (I1<<2)+2
I1 = GT(X, PSHUFFLE(T, I))
I = I+(I1<<1)+1
I1 = GT(X, PSHUFFLE(T, I))
I = I+I1+1
```

In the above pseudo-code, T represents the range limit vector, I represents the ith element of the input vector X and range limit vector T.

In one embodiment, an instruction and corresponding logic is used to generate range detection vector R. When the range detection vector R is determined, other operations associated in evaluating the spline function associated with the particular mathematical operation in question can be performed, including the coefficient matching and polynomial calculation operations.

In one embodiment, each polynomial corresponding to each range of the spline in FIG. 4 has a corresponding coefficient. Coefficient matching matches coefficient vector elements to range detection vector elements generated in one embodiment of the invention. In the example illustrated in FIG. 4, there are six ranges, which may be described by the following polynomials:

Range 1: y=2*x (0<=X<10)
Range 2: y=0*x+20 (10<=X<30)
Range 3: y=−2*x+20 (30<=X<50)
Range 4: y=0*x−20 (50<=X<70)
Range 5: y=2*x−20 (70<=X<80)
Range 6: y=0 (80<=X<=255)

Coefficient matching is based on the result of the range detection stage. The number of resulting coefficient vectors equals the order of the highest polynomial+1. Continuing the above example, the resulting coefficient vectors $C_1$ and $C_2$ for the input vector X described in FIG. 4 are illustrated in the following:

$C_1$ = [0|2|−2|2|−2|0|0|2]

$C_2$ = [20|−20|20|0|20|0|−20|0]

The order of all polynomials in the above example is one, therefore the number of resulting coefficient vectors is two. In one embodiment, the $C_1$ and $C_2$ vectors are calculate using a shuffle instruction, which stores the appropriate coefficient in the corresponding element of the two coefficient vectors C1 and C2 based on the output of the range detection stage described in FIGS. 5a and 5b.

After the coefficients of the polynomials corresponding to input vector X are calculated, the polynomial evaluation calculation may be performed for each input value in the input vector X. Polynomial calculations may be divided into two main operations, in one embodiment. The first operation includes finding the offset of each input value from the beginning of its range of the spline. Finding the offsets may be accomplished, in one embodiment, by matching the beginning of each range to each input point using a shuffle instruction, for example. The offset from the beginning of each range of the spline of FIG. 4 is then calculated by subtracting the beginning value of each range from the corresponding input vector element. For example, the point 77 in the spline of FIG. 4 would be assigned to range 5. It's offset from the beginning of it's assigned range is 7 since the beginning of range 5 is at 70. The second operation includes calculating the output vector elements for each input vector element. In order to calculate the final output vector, the offset found in the beginning of a range is found and is set as an input element for the relevant polynomial. For example, the range 5 polynomial is described by the following formula: y=2*x−20. For the input vector element 77 we get an offset of 7, and so the final value for point 77 would be y=2*(offset)−20=2*(7)−20=−6. After calculating the remaining polynomials corresponding to the input vector elements, the result may be stored in a result vector. The following illustrates the vector values for the beginning range values B, offset vector values O, and output vector values Y:

B = [10|70|30|0|30|80|50|0]

O = [15|7|2|8|17|43|12|1]

Y = [20|−6|16|16|−14|0|−20|2]

The output vector Y is calculated according to one embodiment by the expression, The output vector Y is calculated in this example by "Y=O*C1+C2".

Figure 6:
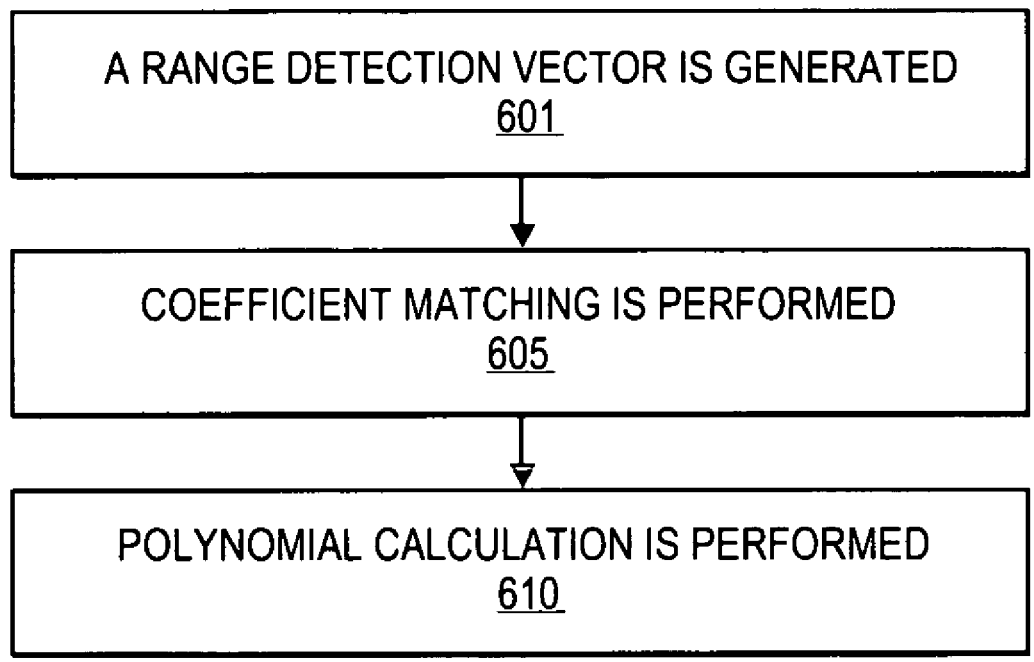
FIG. 6 is a flow diagram of operations that may be used for performing at least one embodiment of the invention.

FIG. 6 illustrates a flow diagram of operations that may be used in conjunction with at least one embodiment of the invention. In one embodiment, at operation 601, a range detection vector is generated. In one embodiment, the range detection vector is generated for each input vector element according to processes, such as binary search and logic illustrated herein. At operation 605, coefficient matching is performed to generate coefficients of the polynomials corresponding to each range of the spline, according to the input vector elements. At operation 610, a polynomial calculation is performed for each element in the input vector and the result stored in a result vector.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
    logic to perform a range detection instruction to determine a range value for each spline polynomial corresponding to a plurality of input vector elements.

2. The apparatus of claim 1, wherein the logic includes comparison logic to compare each element of an input vector to a corresponding limit range vector element.

3. The apparatus of claim 1, wherein the logic includes a binary search logic to compare each element of an input vector to a corresponding limit range vector element.

4. The apparatus of claim 1, wherein the logic includes a range vector storage to store the range value vector including the range values.

5. The apparatus of claim 4, wherein the logic includes an input vector storage to store the input vector elements.

6. The apparatus of claim 5, wherein the logic includes at least one coefficient vector storage to store a plurality of coefficient vector elements corresponding the input vector elements.

7. The apparatus of claim 6, wherein the logic includes at least one offset vector storage to store a plurality of offset vector elements corresponding to the input vector elements.

8. The apparatus of claim 7, wherein the logic includes an output vector storage to store a plurality of output vector elements corresponding to the input vector elements.

9. A computer implemented method comprising:
performing a single instruction multiple data (SIMD) range detection instruction to generate a plurality of range values corresponding to a plurality of input values of a spline function;
performing a coefficient matching operation to generate a plurality of coefficients corresponding to a plurality of polynomials corresponding to the input values of the spline function;
performing a polynomial evaluation calculation to generate a plurality of output values corresponding to the plurality of input values.

10. The method of claim 9, wherein the SIMD range detection instruction is to cause range detection logic to generate a range vector including the plurality of range values.

11. The method of claim 10, wherein the range detection logic includes comparison logic to compare each of the plurality of input values to a corresponding limit range vector element.

12. The method of claim 10, wherein the logic includes a binary search logic to compare each of the plurality of input values to a corresponding limit range vector element.

13. A system comprising:
a storage to store a range detection instruction;
a processor to determine a range value for each spline polynomial corresponding to a plurality of input vector elements in response to performing the range detection instruction.

14. The system of claim 13, wherein the processor includes comparison logic to compare each element of an input vector to a corresponding limit range vector element.

15. The system of claim 13, wherein the processor includes a binary search logic to compare each element of an input vector to a corresponding limit range vector element.

16. The system of claim 13, wherein the processor includes a range vector storage to store the range value vector including the range values.

17. The system of claim 16, wherein the processor includes an input vector storage to store the input vector elements.

18. The system of claim 17, wherein the processor includes at least one coefficient vector storage to store a plurality of coefficient vector elements corresponding the input vector elements.

19. The system of claim 18, wherein the processor includes at least one offset vector storage to store a plurality of offset vector elements corresponding to the input vector elements.

20. A processor comprising:
a first logic to perform a range detection instruction to generate a plurality of range values corresponding to a plurality of input values of a spline function;
a second logic to perform a coefficient matching operation to generate a plurality of coefficients corresponding to a plurality of polynomials corresponding to the input values of the spline function;
a third logic to perform a polynomial evaluation calculation to generate a plurality of output values corresponding to the plurality of input values.

21. The processor of claim 20, wherein the range detection instruction is to cause the first logic to generate a range vector including the plurality of range values.

22. The processor of claim 21, wherein the first logic includes comparison logic to compare each of the plurality of input values to a corresponding limit range vector element.

23. The processor of claim 21, wherein the first logic includes a binary search logic to compare each of the plurality of input values to a corresponding limit range vector element.

* * * * *